United States Patent [19]
Castelli

[11] 3,957,656
[45] May 18, 1976

[54] PLATE SEPARATOR FOR FLUID MIXTURES

[76] Inventor: Joseph L. Castelli, 611 Forest Road, Wayne, Pa. 19087

[22] Filed: Mar. 4, 1974

[21] Appl. No.: 447,795

Related U.S. Application Data

[63] Continuation of Ser. No. 248,421, April 28, 1972, abandoned.

[52] U.S. Cl. .............................................. 210/521
[51] Int. Cl.² ......................................... B01D 21/00
[58] Field of Search .............. 210/83, 84, 513, 521, 210/522; 55/440

[56] References Cited
UNITED STATES PATENTS

| | | | |
|---|---|---|---|
| 2,207,399 | 7/1940 | Gaerther | 210/521 |
| 2,479,625 | 8/1949 | Kimmell | 55/440 |
| 2,497,392 | 2/1950 | Breukel | 210/521 |
| 2,595,838 | 5/1952 | Fuglie | 210/521 X |
| 2,868,384 | 1/1959 | Puddington | 210/521 |
| 3,358,580 | 12/1967 | Freese et al. | 55/440 X |
| 3,563,389 | 2/1971 | Mizrahi et al. | 210/521 |
| 3,666,112 | 5/1972 | Pielkenrood | 210/521 |
| 3,666,112 | 5/1972 | Pielkenrood | 210/521 |
| 3,741,401 | 6/1973 | Hsiung | 210/521 |
| 3,751,886 | 8/1973 | Sokolowski | 55/440 |

FOREIGN PATENTS OR APPLICATIONS

| | | | |
|---|---|---|---|
| 1,098,155 | 7/1955 | France | 210/521 |

*Primary Examiner*—Theodore A. Granger

[57] ABSTRACT

The plates in a plate type separator have a corrugated configuration and are stacked with the corrugations parallel to each other and normal to the flow of the mixture to be separated. The corrugations on each plate are shaped and positioned relative to those on adjacent plates to provide alternatively constricting and expanding fluid passages. Accelerations and decelerations are thereby imparted to the mixture. Dispersed drops of different sizes will acquire different accelerations and decelerations, enhancing collisions between drops and coalescense of them.

2 Claims, 4 Drawing Figures

PLATE SEPARATOR FOR FLUID MIXTURES

This is a continuation of application Ser. No. 248,421, filed Apr. 28, 1972, now abandoned.

BACKGROUND OF THE INVENTION

This invention relates generally to plate separators for fluid mixtures, and more particularly to a separator having particular utility for separating a water/oil mixture.

The cude oil from an oil well has mixed with it water (fresh or brine), sand, and other substances. Current separation apparatus and techniques have as a by-product a water/oil mixture typically having from 200 to 1000 ppm of oil. This by-product may be disposed of in an inactive well if one is convenient. In many cases, however, there is no available well for disposal. Various laws and regulations prohibit certain other methods of disposition. For example, the U.S. Department of Interior has issued Outer Continental Shelf Order No. 8 which prohibits the discharge in regions of the Gulf of Mexico of oily-waste having an average oil content greater than 50 ppm.

Consequently, there is a need for separation equipment which will provide a higher degree of separation.

SUMMARY OF THE INVENTION

In a preferred form of the invention, the mixture to be separated is introduced at one end of a container in a fairly even distribution. It flows to the other end of the container through a horizontally oriented plate bank. The plates are closely spaced, and are configured to alternately constrict and expand the fluid passages to repetitively, gently, accelerate and decelerate the mixture while maintaining laminar flow. The changes in acceleration increase collisions between oil drops of various sizes thereby enhancing coalescence. The fluid passages are formed using plates having a sinusoidal cross-section.

DESCRIPTION OF THE PREFERRED EMBODIMENT

Figure 1:
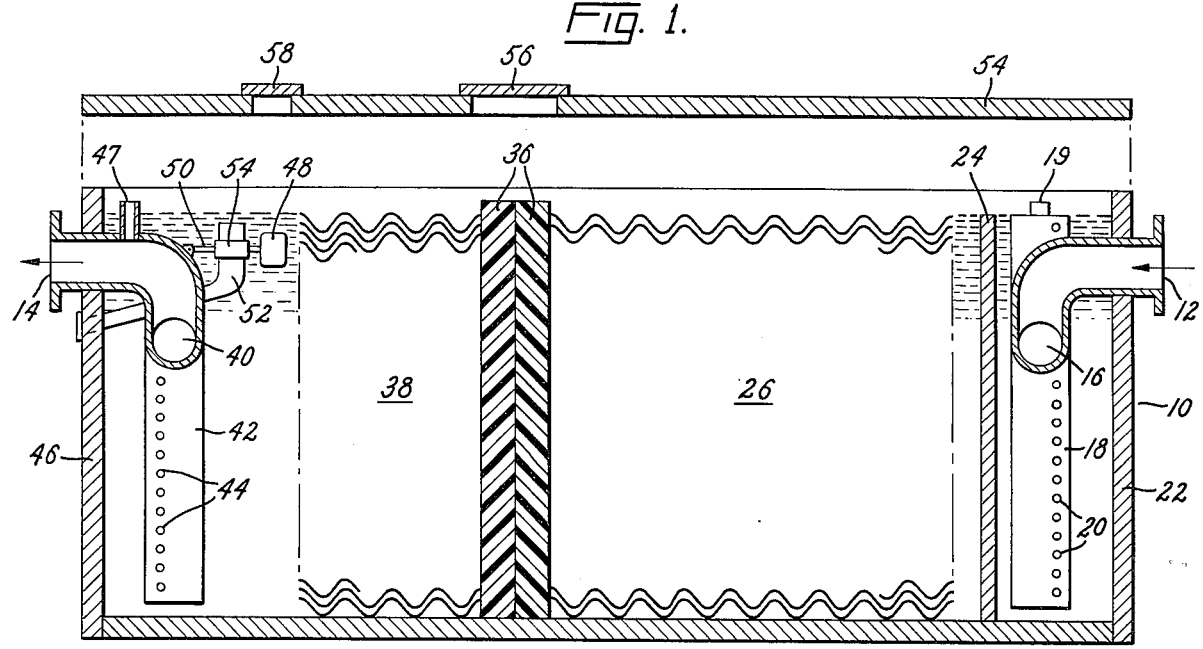
FIG. 1 is a cross-section of a plate separator in accordance with the invention.

Referring to FIG. 1, container 10 has flanged intake pipe 12 at one end, and flanged discharge pipe 14 at the other end. Transverse manifold 16 is connected to intake pipe 12, and has two or more vertical distribution pipes 18 connected to it. Each distribution pipe 12 has a plurality of holes 20 on the portion generally facing container wall 22. The mixture entering through intake pipe 12 will thereby be fairly evenly distributed throughout the intake end of container 10. Vents 19 are provided at the tops of vertical distribution pipes 18 to permit escape of excess gas.

The even distribution is desired to minimize turbulence which would impede separation of the mixture components. Further flow equalization may be achieved by using flow equalizing baffle 24 comprising a number of parallel, vertical spaced slats.

The mixture which has passed through flow equalizing baffle 24 next enters plate separator 26. As is well known in the art, separation is enhanced by dividing the flow into fairly thin layers by using closely spaced plates to form flow passages. The lighter component of the mixture tends to form a layer next to the upper plate in each passage, and the heavier component, a layer adjacent the lower plates.

In accordance with the invention, the flow passages of plate separator 26 are made to alternately constrict and expand. The mixture thereby alternately accelerates and decelerates in a gently pulsating flow. Consider the case of a water/oil mixture. The oil (the dispersed medium) is in the form of drops of various sizes. If a small drop collides with a larger drop they coalesce into a still larger drop. Coalescence, and consequently separation, can be enhanced by increasing the frequency of collisions between drops. During an acceleration or deceleration of the mixture drops will move at a rate proportional to their size. Relative motion between drops of different sizes therefore occurs increasing the collisions over the number which would occur under a constant velocity condition.

The nature of the mixture is such that the dispersed medium is so finely divided that it will not separate by gravity alone (at least not for an inordinately long time). In fact a typical application of this invention is in the treatment of the water/oil mixture remaining after gravity separation. The coalescing of the minute drops of oil is consequently necessary for separation from the dispersion medium (water in this example). The larger the oil drop the faster it will rise in the water.

Although many forms of alternately constricting and expanding passages can be devised, some design restrictions exist. If changes in the size of the passages are made angular or abrupt, turbulence will be induced which will tend to break up drops rather than form them. Moreover, the distances between plates should be fairly small so that oil drops will not have far to rise.

Figure 2:
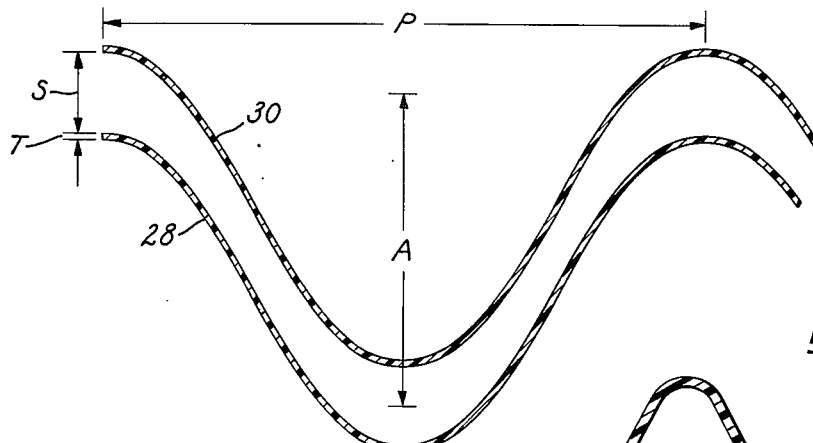
FIG. 2 is a cross-section of one embodiment of a portion of a pair of plates employed in the apparatus of FIG. 1.

As generally indicated in FIG. 1, plate separator 26 is composed of a stack of thin plates having a wavy cross-section. As more clearly illustrated in FIG. 2, plates 28 and 30 have the form of a sine wave having a pitch P and amplitude A. The plates are preferably made of an oleophilic material of a thickness T, and have a maximum spacing S between them.

In one separator constructed in accordance with the invention, the following dimensions were used:

| | |
|---|---|
| P = | 2.66" |
| A = | 1.0" |
| T = | 0.060" |
| S = | 0.25" |

The plates were fabricated of Fiberglas; however, it is expected that polypropylene will give improved performance.

It should be understood that other cross-sectional configurations can also be used. For example, narrow, straight passages can be connected by wider, curvilinear passages as shown in FIG. 3.

Figure 3:
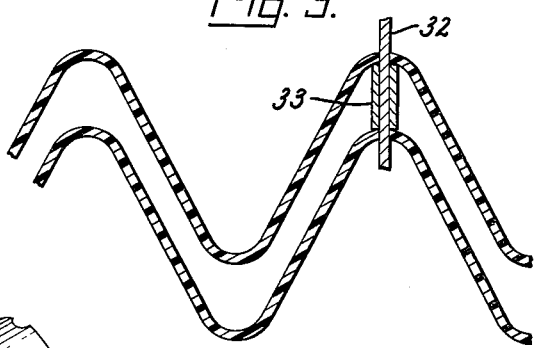
FIG. 3 is a cross-section of another embodiment of a portion of a pair of plates employed in the apparatus of FIG. 1.

Also illustrated in FIG. 3, tie rod 32 in conjunction with spool 33 are used to effectuate the desired spacing of the plates.

Figure 4:
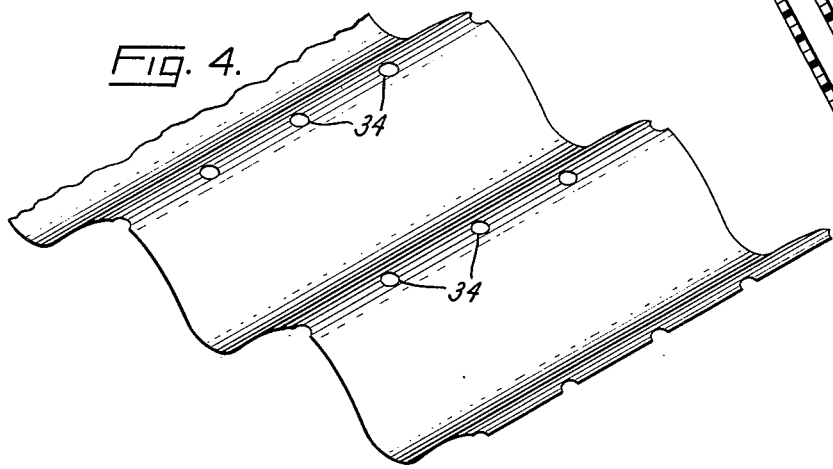
FIG. 4 is an isometric of a plate employed in the apparatus of FIG. 1.

As would be expected, oil has a tendency to collect beneath the crests of the upper plates. As illustrated in FIG. 4, bleed holes 34 are provided through the plates at the crest portion. Semicircular bleed holes may also be provided at the edges/ends of the plates which, together with similarly located semicircular bleed holes in adjacent plates, combine to form circular bleed holes. Certain of the bleed holes may be used to contain tie rods to form a unitary stack with appropriate spacers.

For some mixtures adequate separation may be achieved solely by use of the apparatus thus far described. In other cases, the addition of coalescing filters 36 (as shown in FIG. 1) may enhance the process. Industrial Scott Foam produced by Scott Paper Company has been used as filter material with a water/oil mixture with satisfactory results.

An additional section of separator plates 38 following the coalescing filters may also be employed as illustrated.

Flanged discharge pipe 14 is connected to transverse manifold 40 which has two or more vertical collection pipes 42 depending from it. Collection pipes 42 have a plurality of holes 44 on the portions facing container wall 46. It should be noted that while distribution pipes 18 extended up to the surface of the mixture, collection pipes 42 are designed to collect liquid well below the surface to minimize the entrainment of the separated material at the top. Vent 47 is provided to avoid siphoning action which might tend to empty container 10.

The dispersed material which has been separated collects at the top in a layer or film. Float 48, attached to pivoted arm 50, supports flexible conduit 52 in collar 54. Conduit 52 is open at the top to drain the film which has collected. The position of conduit 52 in collar 54 is preferably made adjustable to permit changes for various thicknesses of films.

Cover 54 is preferably provided to minimize oxidation, and also permits the apparatus to be placed outdoors. Access cover 56 when removed permits replacement or cleaning of coalescing filters 36. Similarly, access cover 58 permits ready adjustment of float 48 and the level of conduit 58.

While a particular embodiment of a plate separator for fluid mixtures has been illustrated and described, it will be obvious that changes and modifications may be made without departing from the spirit of the invention and the scope of the appended claims.

I claim:

1. Apparatus for separating components of different densities in a fluid mixture or emulsion comprising:
   a container;
   inlet means at one end of said container for introducing said mixture at various levels within said container to minimize turbulence in said container;
   first discharge means at the other end of said container for removing the more dense component at various levels below the level of the less dense component;
   second discharge means at said other end of said container for removing the less dense component at a level above the top level of the more dense component;
   at least one stack of horizontally disposed spaced plates having alternating crests and valleys forming alternately constricting and expanding passages normal to the flow of the mixture between said inlet means and said discharge means; and
   said spaced plates having spaced bleed holes at the peaks of the crests.

2. Apparatus according to claim 1 wherein:
   said spaced plates have sinusoidal cross-sections.

* * * * *